(12) United States Patent
Zuppicich

(10) Patent No.: US 6,213,392 B1
(45) Date of Patent: Apr. 10, 2001

(54) CARD INTERFACE FOR INTERFACING A HOST APPLICATION PROGRAM TO DATA STORAGE CARDS

(75) Inventor: Alan N. Zuppicich, Auckland (NZ)

(73) Assignee: SmartMove, Ltd., Auckland (NZ)

( * ) Notice: Subject to any disclaimer, the term of this patent is extended or adjusted under 35 U.S.C. 154(b) by 0 days.

(21) Appl. No.: 08/945,626

(22) PCT Filed: May 9, 1996

(86) PCT No.: PCT/NZ96/00038

§ 371 Date: May 27, 1998

§ 102(e) Date: May 27, 1998

(87) PCT Pub. No.: WO96/36051

PCT Pub. Date: Nov. 14, 1996

(30) Foreign Application Priority Data

May 9, 1995 (NZ) .................................................. 272094

(51) Int. Cl.[7] .................................................. G06K 5/00
(52) U.S. Cl. ........................................ 235/380; 235/375
(58) Field of Search ................................ 235/380, 382.5, 235/382, 375, 487, 492; 340/825.31; 395/500

(56) References Cited

U.S. PATENT DOCUMENTS

| | | | |
|---|---|---|---|
| 4,392,207 | 7/1983 | Dockal | 364/900 |
| 4,618,925 | 10/1986 | Bratt et al. | 364/200 |
| 4,823,257 | 4/1989 | Tonomura | 364/200 |
| 4,839,640 * | 6/1989 | Ozer et al. | 340/825.31 |
| 5,463,772 | 10/1995 | Thompson et al. | 395/600 |
| 5,594,233 | 1/1997 | Kenneth et al. | 235/492 |
| 5,619,683 * | 4/1997 | Kreft | 395/500 |
| 5,651,116 | 7/1997 | Le Roux | 395/200.14 |
| 5,714,741 | 2/1998 | Pieterse et al. | 235/380 |
| 5,761,625 | 6/1998 | Honcik et al. | 701/14 |

FOREIGN PATENT DOCUMENTS

| | | |
|---|---|---|
| 0 583 723 | 2/1994 | (EP) . |
| 0 712 087 | 5/1996 | (EP) . |
| 2 667 171 | 9/1990 | (FR) . |
| 63-250726 | 10/1988 | (JP) . |
| 63-250789 | 10/1988 | (JP) . |
| 04042321 | 2/1992 | (JP) . |

* cited by examiner

Primary Examiner—Karl D. Frech
(74) Attorney, Agent, or Firm—Choate, Hall & Stewart

(57) ABSTRACT

A card reader/writer which interfaces between a host application program and a data storage card. The card reader/writer reads from and writes to the application program with high level language of the commands. The card reader/writer translates the high level language commands of the host program to corresponding sequences of low level commands for reading and writing to the data storage card. The card reader/writer stores a plurality of sets of such low level commands, and is able to establish the card type for any card interfaced with the card reader/writer, and to use the appropriate command set for the established card type. The card reader/writer also translates low level commands from the card to high level commands for the host application program. The card reader/writer can be loaded with low level command sets for additional card types as required.

12 Claims, 8 Drawing Sheets

First Array

| Data String | Card Identifier |
|---|---|
| X X X | X X X |
| ⋮ | ⋮ |

Second Array

| Card Identifier | Commands |
|---|---|
| X X X | 1. X X X<br>2. Y Y Y<br>3. Z Z Z |
| Y Y Y | 1. X X X |
| ⋮ | ⋮ |

Detect card → Read data string

↓

Search first array to retrieve card identifier corresponding to data string

↓

Search second array to select appropriate command strings

↓

Use command strings to perform translation

FIG. 8

CARD INTERFACE FOR INTERFACING A HOST APPLICATION PROGRAM TO DATA STORAGE CARDS

TECHNICAL FIELD

This invention relates to cards having magnetic or electronic data storage ("Smartcards") capability and in particular to interfaces between such cards and an application specific programmed controller.

BACKGROUND ART

Smartcards and smartcard readers are disclosed in patents to Innovatron and Bull CP. See for example U.S. Pat. Nos. 4,102,493 and 4,404,464. Smartcards generally conform to one or more parts of ISO standard 7816.

Several prior art smartcard reader/writers use a programmed microprocessor to perform a series of predetermined actions on a smartcard under control of an external control system. The external control system must have "full knowledge" of the smartcard being used. Any changes to the cards being used must be reflected in changes to the external control system. The designer or user of the external control system must have an extensive understanding of the smartcards for which the reader/writer is intended.

Several other prior art smartcard reader/writers incorporate a programmed microprocessor to perform all actions on a smartcard autonomously. These reader/writers typically form a completed product, i.e. vending machine or point-of-sale terminal. Alteration of the product to support new or different smartcards requires a redesign or modification of the fundamental reader/writer component. This restricts the ability of an original equipment manufacturer to incorporate smartcard technology in traditional products.

Existing smartcard reader/writers fall into two categories. The first is that which acts as card coupler. A card coupler only provides the hardware and minimum necessary software to read from, or write to, a smartcard. The coupler may support a range of cards, possible from more than one card manufacturer. However, this support is, because the final use is unknown, largely confined to the simplest and most generalised tasks. The coupler is commonly used as a development tool for entry into the smartcard field, or as a means of adding smartcard capability to existing product designs. In either case, the user of the coupler must gain or possess a good knowledge of the smartcard, the card data structures, and data transfer procedures.

The other extreme is that of an application or product with imbedded smartcard capability. The reader is an intrinsic part of the host control system. Support is limited to a few card types, with data contents, structures, security and transfer procedures predetermined by the equipment manufacturer.

There is currently no easy way for smartcard capability to be added to a manufacturers product or for azn existing card reader to be altered to handle new smart card types, short of that manufacturer becoming an expert in the smartcard field. Should a competitor proceed down this path, the delay in recovering to a competitive position would be costly and time consuming. Furthermore there is currently no card reader available which can read a variety of types of magnetic cards as well as a variety of types of chip cards.

DISCLOSURE OF INVENTION

It is therefore an object of the present invention to provide an interface for use between cards having magnetic or electronic data storage capability and an application specific program controller that at least goes some way toward overcoming the above disadvantages.

In a first aspect the invention consists in a card reader/writer which interfaces a host application program with a data storage card characterised in that:

said card reader/writer can respond to said application program using at least one designated high level language, a plurality of low level protocol sets are stored which each correspond to a known data storage card type, said card reader is able to establish the card type for any card interfaced to it for which it has a protocol set, and select from its store of protocols the appropriate low level protocol for the established card type, said card reader/writer reads and translates high level language commands from the host program to corresponding commands within said established low level protocol and writes these low level commands to said card, and said card reader/writer reads commands in said established low level protocol from said card translates them to a corresponding command in said high level language and writes these commands to said host application program.

In a second aspect the invention consists in a method of interfacing a host application program with a data storage card comprising the steps of:

establishing the card type, selecting from a store of protocols the appropriate low level protocol for the established card type, reading high level language commands from the host program, translating said read high level language commands to corresponding commands within said established low level protocol, writing said corresponding commands to said card, reading commands in said established low level protocol from said card, translating said low level protocol commands into corresponding commands from said high level language, and writing said corresponding commands from said high level language to said host application program.

In a third aspect the invention consists in a method of enabling a controller to read and write data via a card read/write station to a plurality of known types of card devices incorporating magnetic or electronic data storage means, which method uses a stored-program stored-data processor, said method comprising: storing first data arrays containing strings of known card characterising data and for each string its corresponding card identifier, storing second data arrays containing card identifiers and for each identifier its corresponding command strings, and executing a program on said processor which causes said processor to:

(1) detect the presence of a card in said read/write station and to pass a card detect signal to said controller, (2) read the data string which characterises the card, (3) search through at least one said first array for a matching data string, and upon making a successful match to retrieve the corresponding card identifier, (4) select the appropriate command strings in said second array using the retrieved card identifier, (5) accept generic transaction instructions from said controller, (6) translate the instructions from said controller to commands appropriate to the inserted card using the selected command strings from the second array, and (7) either read or write data to said card in accordance with said generic instructions.

In a fourth aspect the invention consists in a universal card interface for interfacing smartcards and other card devices having electronic or magnetic data storage with a controller requiring read/write access to said cards comprising:

a card read/write station into which cards may be inserted for data transfer, a processor having associated memory and input-output ports, said read/write station connected to one input-output port and said controller connected to a second input-output port, interface software and data arrays stored in said memory, said data arrays including first and second data arrays with said first data arrays containing strings of known card characterising data and for each string its corresponding card identifier, said second data arrays containing card identifiers and for each identifier its corresponding command strings, said software when executed by said processor causing said processor to:

(1) detect the presence of a card in said read/write station and to pass a card detect signal to said controller, (2) read the data string which characterises the card, (3) search through at least one said first array for a matching data string, and upon making a successful match to retrieve the corresponding card identifier, (4) select the appropriate command strings in said second array using the retrieved card identifier, (5) accept generic transaction instructions from said controller, (6) translate the instructions from said controller to commands appropriate to the inserted card using the selected command strings from the second array, and (7) either read or write data to said card in accordance with said generic instructions.

In a fifth aspect the invention consists in a method of enabling application software to interface with any known type of smartcard or other card devices having electronic or magnetic data storage, comprising:

(1) reading from the card to be interfaced the data string which characterises that card, (2) searching through a first data array containing strings of known card characterising data, and for each string its corresponding card identifier, for a matching data string, and upon making a successful match retrieving the corresponding card identifier, (3) selecting the appropriate command strings from a second data array containing card identifiers, and for each identifier its corresponding command strings, using the retrieved card identifier, (4) accepting generic transaction instructions from said application software, (5) translating the instructions from said application software to low level commands appropriate to the card being interfaced using the selected command strings from said second data array, and (6) causing data to be either read from or written to said card in accordance with said generic instructions.

In a sixth aspect the invention consists in a software algorithm which enables application software to interface with any known type of smartcard or other card devices having electronic or magnetic data storage, comprising a hierarchy of functional modules wherein:

a first level module reads from the card to be interfaced the data string which characterises that card and passes said data string to a second level module, the second level module searches through a first data array containing strings of known card characterising data, and for each string its corresponding card identifier, for a matching data string, and upon making a successful match retrieves the corresponding card identifier and passes said card identifier to a third level module, the third level module selects the appropriate command strings from a second data array containing card identifiers, and for each identifier its corresponding command strings, using the card identifier passed to it, a fifth level module accepts generic transaction instructions from said application software and passes those instructions to a fourth level module, the fourth level module translates the instructions from said fourth level module to low level commands appropriate to the card being interfaced using the command strings selected by the third level module, and the first level module either reads from or writes to said card in accordance with the translated generic instructions passed from the fourth level module.

The universal card interface of the present invention is able to recognise any ISO card type presented to it, communicate with the card using the protocols appropriate to that card type, and communicate with the host application program using a high level command language.

BRIEF DESCRIPTION OF DRAWINGS

A particular embodiment of the present invention will now be described with reference to the accompanying drawings in which

FIG. 8 is a flow chart showing the string manipulation functions of the invention.

BEST MODES FOR CARRYING OUT THE INVENTION

One embodiment of the present invention is a Universal Card Interface (or UCI) being a software-controlled card interface device that supports a wide range of smartcards and credit cards.

Referring to FIGS. 1 to 5, the UCI has two major elements, a physical card accepting device 31 and a control system assembly 32 which includes all of the electronic circuitry required for controlling card accepting device 31.

Card accepting device 31 has a single slot 33 which accepts all card types. The form taken by the card accepting device will depend largely on the application intended for the UCI. For example, the size of display and number configuration of buttons on the keypad, configuration of the card slot 33 and mode of physical acceptance of the card (whether the card is fully retracted into the card accepting device or is allowed to remain partially outside the device) are all matters capable of variation. Control system assembly 32 is intended to be independent of application and is capable of supporting card accepting devices of the abovementioned variations.

Figure 1:
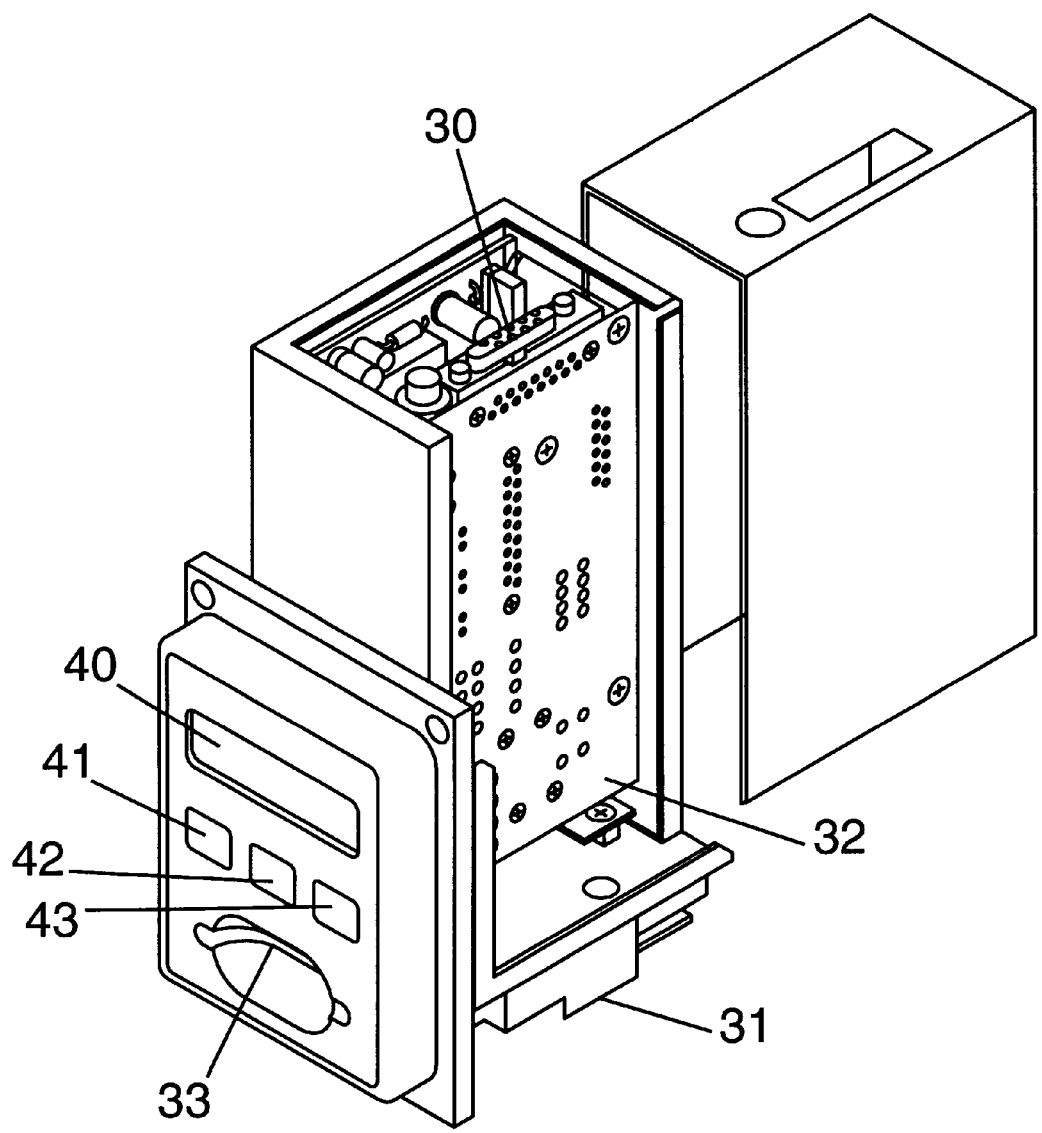
FIG. 1 is a perspective view of the apparatus of the preferred embodiment of the present invention.
Figure 2:
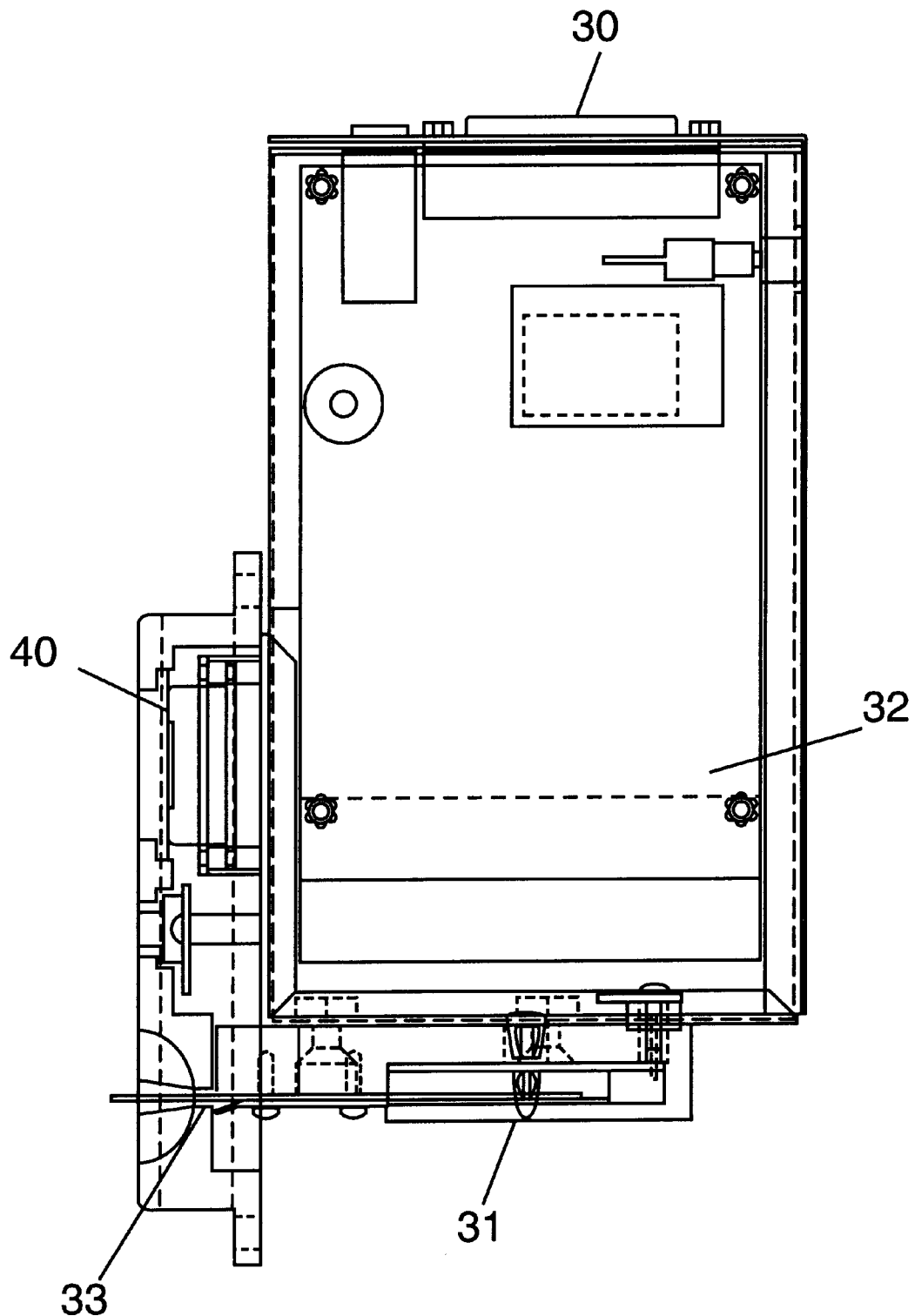
FIG. 2 is a side elevation in cross-section of the apparatus of the embodiment of FIG. 1.

Referring to FIGS. 1 and 2, the card accepting device of the particular embodiment of the present invention has been designed to be easily fitted to existing vending machines, and in particular has been designed to replace standard bank note validator spaces on such machines. The card accepting device has a friendly user interface including a 2 line LCD display 40 which may be in either green or yellow for improved visibility in dark conditions, a user input panel with 3 push buttons (OK 43, BALANCE 41, and CANCEL 42), which preferably provide a tactile response to the user, and a card insertion slot 33. The card insertion slot 33 has a push-pull acceptor, a clearing space for foreign bodies, landing contacts, sealed detector switch, and accepts cards by horizontal insertion, with the chip side up.

Figure 3:
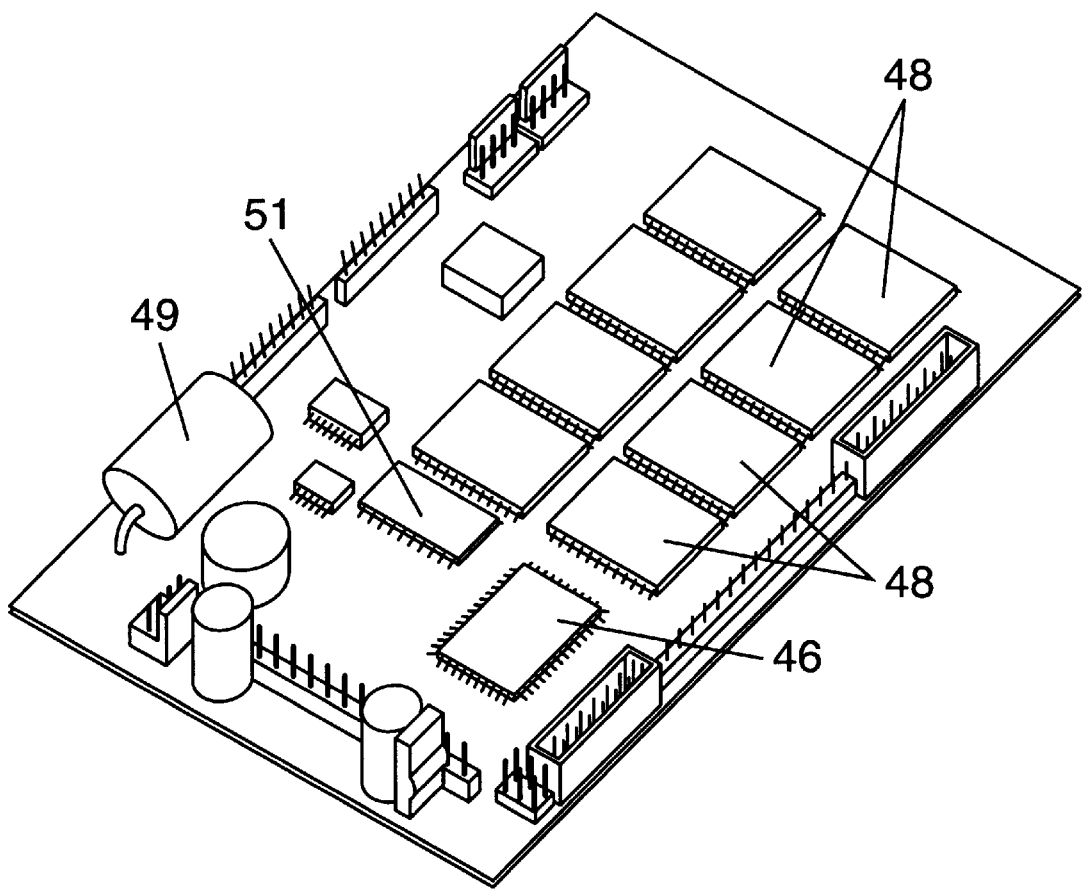
FIG. 3 is a perspective view of the printed circuit board (PCB) of the control system assembly of the preferred embodiment of the present invention.
Figure 4:
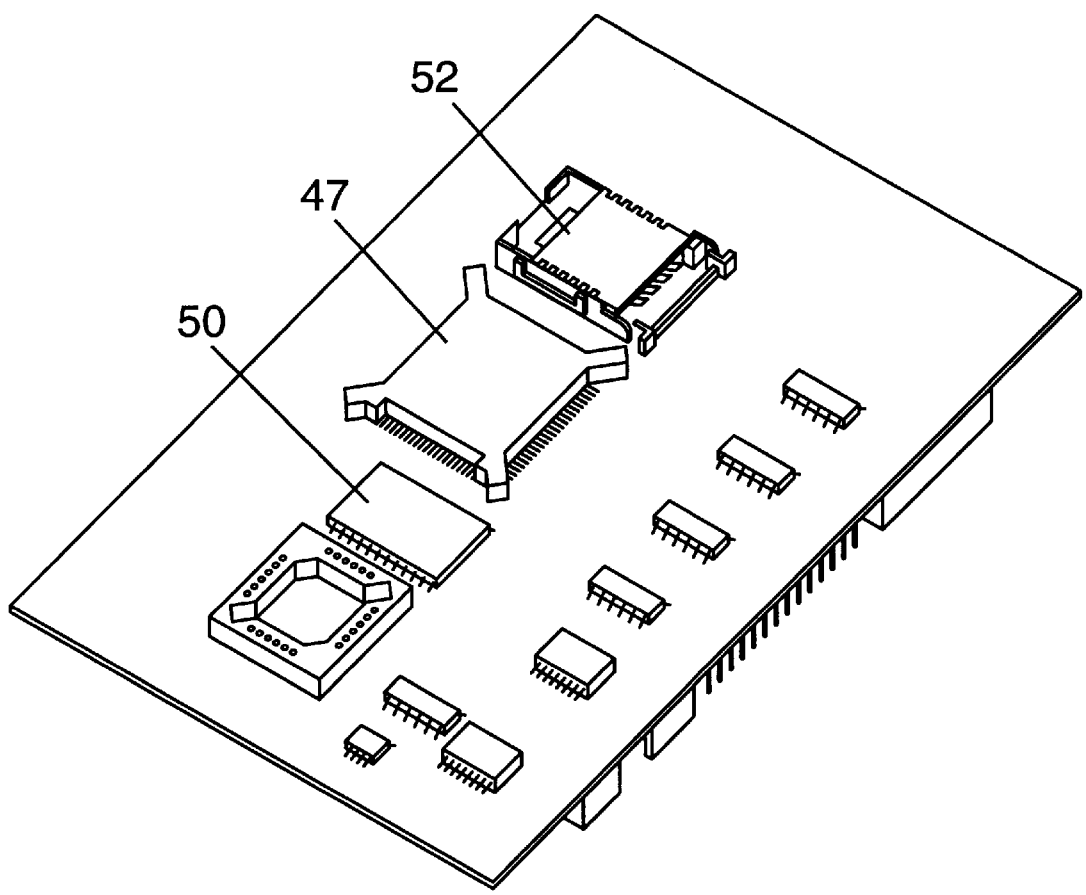
FIG. 4 is another perspective view of the PCB of the preferred embodiment of the present invention.
Figure 5:
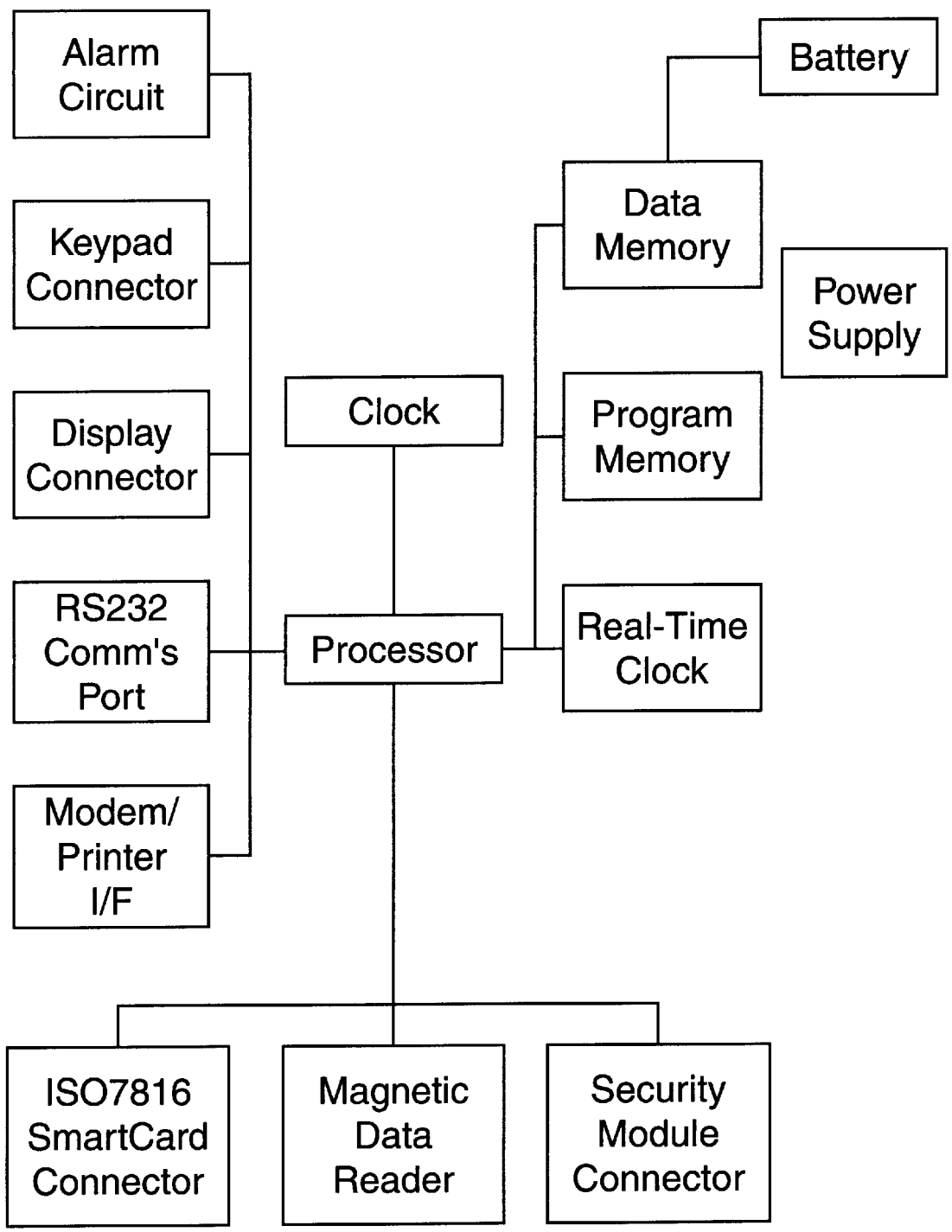
FIG. 5 is a block diagram of the electrical and electronic apparatus of one embodiment of the present invention.

Referring to FIGS. 3 to 5, the UCI control system assembly incorporates a primary microprocessor 46 and a support microprocessor 47. The primary microprocessor 46 may for example be a Dallas DS5002 FP-16. The support microprocessor 47 may for example be a Motorola MC68302.

The example primary processor is derived from industry standard "8051" architecture, with a secure memory protection mechanism to combat against accidental or deliberate tampering or viewing. As with the 8051, the memory is divided into that used by the program and that used for storage of data. This memory 48 is all battery-backed static RAM, the battery 49 being a long-life lithium cell. The memory 48 is automatically switched to battery and write-protected as the power fails. The processor is protected against erroneous actions by a watch-dog timer. The memory capacity for both data and program are separately configurable. Options range in each case as necessary from 128 Kbytes to 512 Kbytes.

The example support processor is based on the industry standard "68000" architecture, with enhancements for high speed data communication. No sensitive data is held in this memory, with this processor being responsible only for low security functions such as magnetic card reading and data transfer. The processor is protected against erroneous actions by a watch-dog timer. Memory 50 consists of 128 Kbytes of static RAM for program and data. Battery backup of this memory 50 is not necessary, as it is reloaded from the primary microprocessor as required. A 32 Kbyte ROM contains the embedded bootloader. All software except the embedded bootloader is remotely reloadable.

The UCI electrical subassembly further includes a real time clock 51 such as a Dallas DS1293S. The real time clock provides accurate time of day and calendar functions. It operates from an independent clock at 32.768 kHz and receives power from the primary microprocessor 46.

A small socket 52 on the PCB allows a SAM (a physically cut down smartcard) to be added to the board as required. This SAM can be used to hold encryption keys or a cypher algorithm in high security applications. The primary microprocessor 46 may also perform this task, but commercial issues may make using a SAM preferable.

The UCI PCB has connection adapted to receive a 1 or 2 track magnetic stripe reader. The UCI provides 5 volt power to the reader and accepts standard TTL logic level signals.

The reader will accept cards confirming to ISO 7811 or ISO 7813. The UCI can read two tracks simultaneously, these being track 2 and either track 1 or track 3.

The smartcard acceptor circuit is designed to support cards conforming to ISO 7816 with the addition of a suitable mechanical card acceptor mechanism. With the correct card acceptor, hybrid "magnetic and chip" cards can be accepted through a common slot. This is desirable in markets where gradual migration is required. Both synchronous (memory, or token) cards and asynchronous (microprocessor) cards can be accepted. The programming voltage (VPP) is preferably limited to 5 volts which is expected by modern cards.

Other user interface options which are preferably supported by the UCI include:

Keypads connectable directly to the UCI. Generally only matrix keypads will be required, however supporting larger keypad configurations would require little extra effort.

Liquid crystal display (LCD) connectable directly to the UCI. Most LCDs utilising the Hitachi HD44780 chip (an industry standard) or its equivalents are suitable. These displays are available in various formats from 1 line, 16 character, up to 4 line, 24 character.

A status indicator. Preferably two light emitting diodes (LED) are positioned at the front of the UCI to provide a low cost indication of the UCI's status. The LEDs if used would protrude through the card slot facia at either end of the card slot, doubling as status indicator and highlighting the card slot position.

An audible feedback indicator. A buzzer is contained on board to provide audible feedback for keystrokes or error conditions. An example of suitable buzzer characteristics would be a buzzer generating a sound pressure level of 90 dB (@0.1 m) at a nominal frequency of 3100 Hz.

The UCI is a uniform interface to third party equipment in which it is to be included. The vendor interface includes three distinct elements, a high voltage relay, a current loop serial bus and an RS232 serial interface. Furthermore, the card accepting device supports serial data modem connection, or printer connection, via RS485/RS232 connector 16.

The control system assembly includes two power sources, in particular a on-board battery which provides backup power to the primary microprocessor memory and to the clock, along with a regulated mains power supply. A suitable battery for the battery power supply might for example be a 3.6 volt 1200 mAHr battery.

Figure 6:
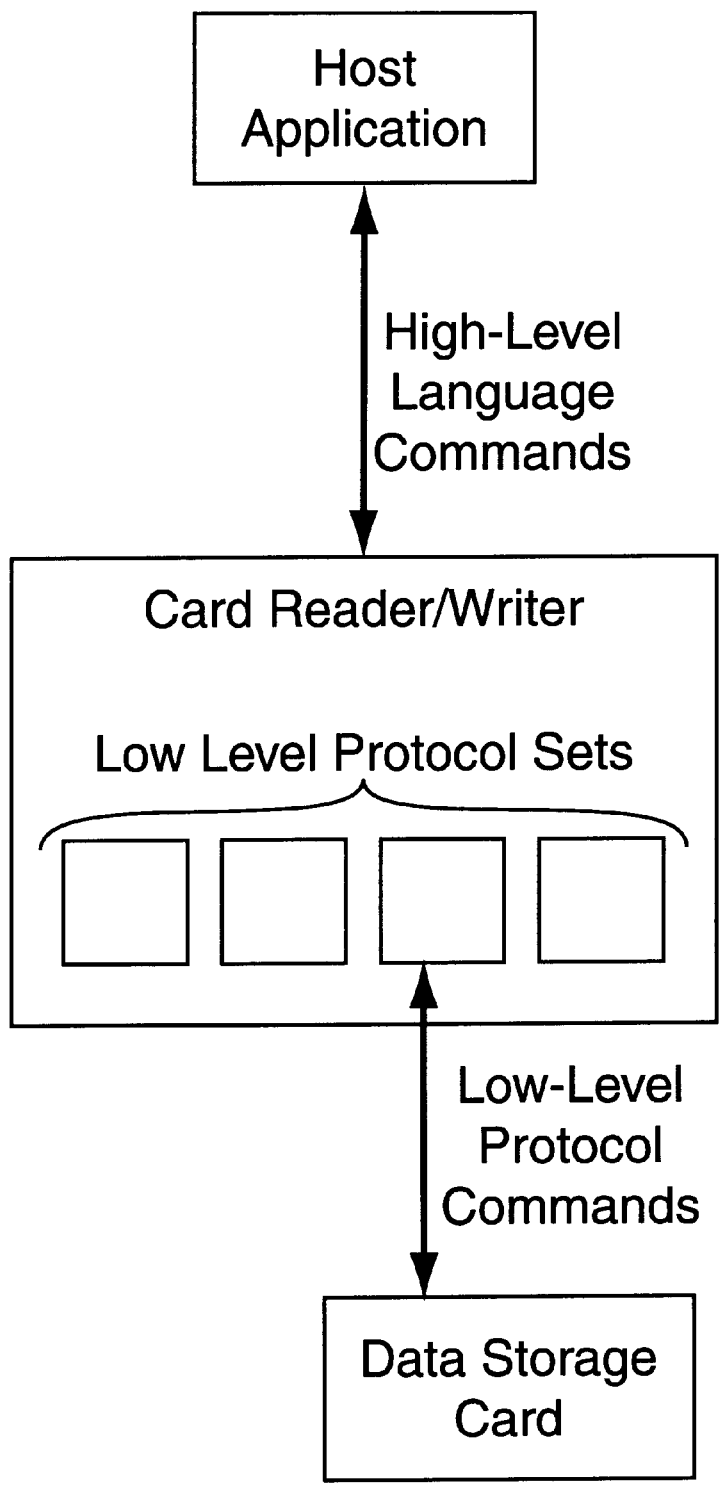
FIG. 6 is a diagram showing the interaction of the card reader/writer with the host application and the smart card.
Figure 7:
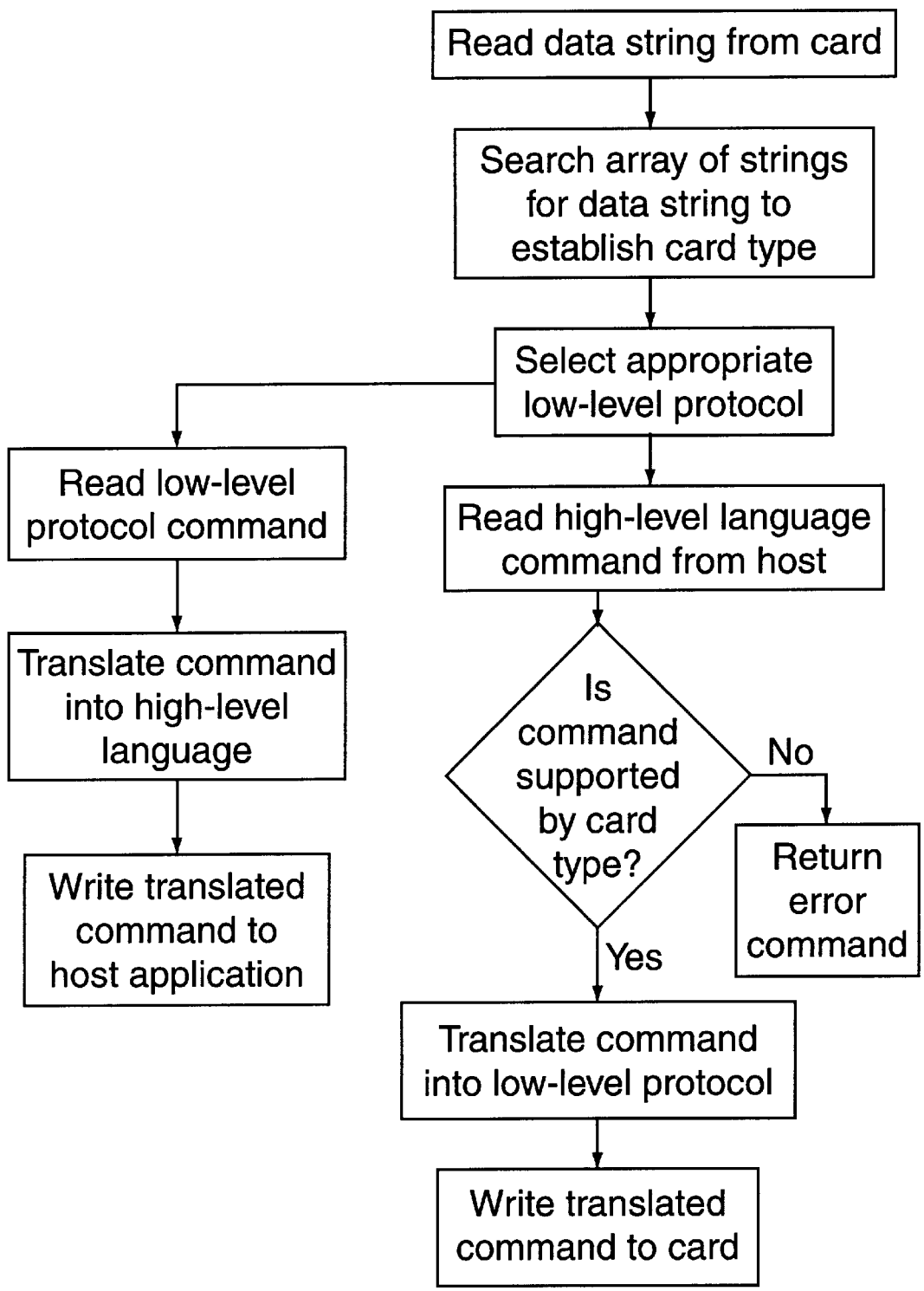
FIG. 7 is a flow chart showing the translation functions of the invention.

The UCI of the present invention has the ability to interface with a plethora of cards, both smart and magnetic, to understand these cards, and to perform whatever action is required, with the absolute minimum of instruction. It can read ISO 7811 credit cards track 1 or track 2, read and write to ISO 7816-3 (T=0 and T=1) smartcards, and read and write ISO 7816 memory cards, as shown in FIGS. 6 and 7.

In traditional smartcard couplers, the electronic support of the card was limited to very simple tasks, because the end use of the coupler was unknown. The present invention, however, extends the abilities of the coupler concept with added layers of software (the microprocessor program), each layer building in more functionality, and at the same time, simplifying the task of communicating with the card. To add these layers and perform a useful function with them, the UCI includes a format database, which contains information on each type of card that the UCI may accept. This information forms the rules and guidelines for use of that card. It includes a summary of the card data structures, transfer procedures, data contents, and security information. The guidelines may refer the UCI to a security module if needs dictate. The security module is a small microprocessor device similar to a smartcard which is a semi-permanent part of the PCB.

With the information available from the format database, the UCI can easily determine the overall functionality of the UCI and card combination. This can modify the sequence of actions taken internally in response to any external instruction. The external device does not need to appreciate the differences between various types of cards. Because the external device does not issue wildly differing instructions with each new card presented, the software interface between UCI and the external device is simplified.

The software interface can be further simplified by recognising that a limited number of instructions will perform the great majority of desired actions on the cards. The top most software layer accumulates all the necessary instructions or commands to define the software interface. The information in the format database is also used to check for any potential breach of system security when using instructions at a lower software layer.

The software is organised in layered modular structures as shown in the following table.

TABLE 1

Layers of the Microprocessor Program

| Layer | Purpose | Access to | | | |
|---|---|---|---|---|---|
| | | Encryption, Security | Card Format Library | Card Primitive Library | Applicable Standards |
| 8 Application | Interface to external environment | | | | |
| 7 Presentation | Uniform interface to Application layer | | Y | | |
| 6 Process Procedures | General interface to all card activity | | Y | | AS 2805 |
| 5 Process Primitives | Support routines | Y | Y | | |
| 4 Entity Procedures | Interface to all card data structures, i.e. Files, Purses, Directories | Y | Y | | |
| 3 Entity Primitives | Support routines for Files, Purses, Directories | | Y | Y | |
| 2 Stream Control, ISO level Commands | Interface at card (ISO) command level | | | Y | ISO 7816 Part 3, ISO 7816 Part 4 |
| 1 Low Level Primitives, Hardware Drivers | Hardware support, and control. Card interface at bit/byte level | | | Y | ISO 7810. ISO 7816 Part 1. ISO 7816 Part 2 |

As can be seen from the above table in the preferred embodiment, the operations of the UCI are split into eight layers.

Each layer can be considered as consisting of collections of objects, where an object is a self-contained arrangement of functions and data. The objects in each layer are generally only accessible to the layer immediately above or below. The interface between layers is well regimented with controls based on the format database information preventing ill-advised operations.

The data contained in the format database is only available to selected objects and layers. This minimises the possibility of the external device gaining sensitive knowledge of particular card formats. Similarly, access to the security and ciphering program modules is also restricted to selected objects and layers.

The format database consists of two primary areas, the format library, and the primitive library. The primitive library contains pre-personalisation details of all cards accepted. This includes card capacity, electrical signal timing, character interchange protocols, and a list of the features available on the basic card. This information is that supplied by the card manufacturer. The format library contains the details added to a card by the issuer, after the card has left the manufacturer.

Having regard now to the operations of each layer, the layers range from the primarily low level character oriented operations of layer 1 to the high level generic interface of layer 8.

Layer 1 responsibilities include the basic actions required for card insertion or removal and the simple transmission of data to and from the card.

Insertion of a card activates a micro switch which is constantly monitored. Card insertion is signalled to higher layers, so that appropriate action can be taken. Higher layers pass down the instruction to attempt to identify the current card. The card then has power and control signals applied according to ISO 7816. When the card is no longer required, the card interface circuitry is powered down in a sequence specified by ISO 7816. If the card is removed prematurely, the same sequence is followed as quickly as possible. Higher layers are informed of the absence of the card, so that further "closing" actions may be taken. This may include deletion of session keys, exception logging, or alerting the cardholder. Another function that is incorporated at this level is encryption or decryption of the data stream.

Transfer of individual characters and bits of data to and from the card is done at this layer, but grouping of characters into messages and commands is the domain of higher layers. In general, UCI hardware is dealt with at this level only on a character by character basis. Coping with the intelligence contained within data streams, messages, commands and the like is left to the higher code layers.

Layer 2 of the UCI controls the interaction with the card at a card command level. Level 2 for example is adapted to correctly format commands and data for transmission to the card by layer 1. Message formatting, error detection, and transmission characteristics for the smartcard are performed by layer 2 to the specifications of ISO 7816.

Support for the various UCI features such as time of day clock, buzzer, communications ports, display, and keypad are enhanced by code in this layer. Other support code found here includes printer drivers, display drivers, modem drivers, keypad buffer, and ISO 7810 magnetic card reader data buffer.

During the card insertion phase, layer 2 is used to initiate the reset process for the card. The card's response to the reset process is used to determine whether the card communicates in a synchronous or asynchronous manner. This information is used by layer 3.

Interfacing to layer 3 is through "traps" or software interrupts. Layer 1–2 traps exist for: real-time clock, system, keypad, LCD, communication ports, magnetic card reader, smartcard/security module.

The operation of layer 3 of the UCI is dependent on the card type. Therefore it is important to correctly identify the card type, dependent on whether it is a synchronous card (typically token cards, or memory cards, non-microprocessor based) or a microprocessor based asynchronous.

In identifying a synchronous card, the first three bytes are read from the card. These are compared with 3, 2 or even 1 byte strings contained in one column of a small array. In an adjacent column are reference numbers to card offerings from various card manufacturers. A match to any string indicates that the card is known, and allowed. Table 2 shows an example of such an array. Having now identified that the card is a synchronous card of a particular "model" or type, from a particular manufacturer, the UCI can select only those commands and handling procedures applicable to this card. The higher layers are therefore informed of the card type found.

TABLE 2

| String to Match | Card Type |
| --- | --- |
| 123 | type 3 |
| 56E | type 1 |
| AB | type 12 |
| C | type 3 |
| 7 | type 18 |

In identifying an asynchronous card, the Historical Bytes of the ISO 7816 Answer To Reset string are compared with strings contained in one column of a small array. In an adjacent column are reference numbers to card offerings from various card manufacturers. A match between strings indicates that the card is known, and allowed. An example of such an array is shown as Table 3.

TABLE 3

| String to Match | Card Type |
| --- | --- |
| 24, 10, 00 | type 6 |
| 30, 11, 03 | type 2 |
| 31, 1F, FF | type 15 |

TABLE 3-continued

| String to Match | Card Type |
| --- | --- |
| 4C, IF, FF | type 7 |
| 4D, 1F, FF | type 19 |
| 23, 00 | type 7 |

Having now identified that the card is an asynchronous card of a particular "model" or type, from a particular manufacturer, the UCI can select only those commands and handling procedures applicable to this card. The higher layers are therefore informed of the card type found. This process is shown schematically in FIG. 8.

Access to the processes outlined above is made through the function:

int decide_card_type (void)

Returns: M_CARD_TYPE, or NULL if card type not known.

In communicating with a synchronous card, layer 3 uses a function "Access_Sync_Card" to control the communication. For example:

int Access_Sync_Card (int command, int card_type, int len, char *pointer)

where command is selected from READ_UPDATE

ERASE_UPDATE
READ_FIXED
READ_TOKEN
READ_MANUFACTURER
DECREMENT_TOKENS
PRESENT_SECRET_CODE card_type is Card Type as determined in L3.1, L3.3, len is the number of bytes to be taken from buffer, or the number of data bytes expected back from the card,

*pointer points to a buffer containing data for the card, or data from the card at completion of the function call, and the function returns NO_ERROR if the command is successful or
ERR_CARD_LOCKED or
ERR_FUNCTION REFUSED or
ERR_THREE_BAD_PRESENTATIONS if the command is unsuccessful Based on the Card Type, and the Command, the function "Access_Sync_Card" refers to a table of "action string" pointers as shown in Table 4.

TABLE 4

A NULL pointer indicates that the Command is invalid for the current card.

| Card Type | Command | | | | |
| --- | --- | --- | --- | --- | --- |
| | READ_UPDATE | READ_FIXED | READ_TOKEN | READ_MANU-FACTURER | DECRE-MENT_TOKENS |
| 1 | 0 | s1 | s2 | s4 | s8 |
| 3 | s5 | s1 | s2 | s4 | s8 |
| 4 | s5 | s1 | s3 | s4 | s7 |
| 5 | 0 | s12 | 0 | s13 | 0 |
| 12 | 0 | s11 | 0 | s13 | 0 |
| 13 | 0 | s15 | 0 | s14 | 0 |
| 17 | | | | | |
| 18 | | | | | |

The pointers s1 etc of Table 4 refer to a further table, for example Table 5, this time of "action strings". An "action string" may be used by one or more cards.

TABLE 5

| Pointer | Action String |
|---|---|
| s1 | |
| s2 | |
| s3 | |
| s4 | READ_128, RESET_ADDRESS, STEP 8. ERASE 32, WRITE 32, NULL |
| s5 | RESET_ADDRESS, STEP 10, READ 32, NULL |
| s6 | RESET_ADDRESS, STEP 10, WRITE 16, NULL |
| s7 | STEP 96, NULL |
| s8 | |
| s9 | |

An "action string" consists of a string of 1 or more "tags", with a NULL terminator. Most "tags" are followed by a "count" value. The "count" determines the number of card bits or clock cycles the "tag" should act upon. For example "action strings" are of the format:
[tag[,count],][tag[,count],]NULL where tag is one of RESET_ADDRESS
  STEP count
  READ count
  ERASE count
  WRITE count.

In communicating with an asynchronous card, layer 3 uses a function "Access_Async_Card" to control the communication. For example: int Access_Async_Card(int command, int card_type, int len, char *pointer, int P1, int P2)

where command may be selected from READ_FILE
  WRITE_FILE
  SELECT_FILE
  SELECT_DIRECTORY
  SELECT_KEY
  UPDATE_FILE
  PRESENT_SECRET_CODE card_type is Card Type as determined in L3.2, L3.3,
len is the number of bytes to be taken from buffer, or the number of bytes expected back from the card,
*pointer points to a buffer containing data for the card, or data from the card at completion of the function call,
P1: argument 1: for example the offset into file
P2: argument 2: for example the selected file number
and the function returns one of:

| | |
|---|---|
| 4001 | ERR_FUNCTION_INVALID |
| 4002 | ERR_FUNCTION_MISMATCH |
| 4xxx hex | other error conditions detected by UCI code |
| 6xxx hex | =ISO and Manufacturer error codes (no translation) |
| 9000 | NO_ERROR |
| 9xxx hex | =ISO and Manufacturer error codes (no translation), | the function returning "NO_ERROR" if the command is executed successfully.

Based on the Card Type, and the Command, the function "Access_Async_Card" refers to a table of "format string" pointers as shown in Table 6.

TABLE 6

A NULL pointer indicates that the Command is invalid for the current card.

| | Format String for Command | | | | |
|---|---|---|---|---|---|
| Card Type | READ_FILE | WRITE_FILE | SELECT_FILE | SELECT_DIRECTORY | SELECT_KEY |
| 6 | 0 | f21 | f12 | f14 | f18 |
| COS16DES | f15 | f21 | f12 | f14 | f18 |
| PCOS | f15 | f21 | f13 | f14 | f17 |
| 2 | 0 | f32 | 0 | f33 | 0 |
| MCOS | 0 | f31 | 0 | f33 | 0 |
| COS | 0 | f35 | 0 | f34 | 0 |
| 15 | | 0 | f39 | 0 | f41 |
| 19 | | | | | |

The pointers refer to a further table such as Table 7 of "format strings". A "format string" may be used by more than one card.

TABLE 7

| Pointer | Action String |
|---|---|
| f154 | 51 80 3A 00 P2 00 |
| f12 | 55 80 3A 00 03 00 |
| f14 | 63 80 34 00 00 08 |
| f18 | 41 84 DA 00 P2 LEN |
| f31 | |
| f33 | |
| f35 | |
| f39 | |
| f41 | |

The format strings are a machine code instruction intended for direct transmittal to the card. The format strings are a small array made up in the form:
FLAG, CLA, INS, P1, P2, LEN
FLAG:
if bit 0 set: "write" command
if bit 1 set: len in parameters must match LEN in string, else error return
if bit 2 set: P2 in parameters must match P2 in string, else error return
if bit 3 set: P1 in parameters must match P1 in string, else error return
if bit 4 set: LEN in string used, parameter ignored
if bit 5 set: P2 in string used, parameter ignored
if bit 6 set: P1 in string used, parameter ignored.

In interfacing with the higher layers, layer 3 uses "command strings". Command strings consist of 1 or more command tags, terminated with a Null. Each command string (CS) is referenced by its CS number or CS name. The same goes for command tags. Command strings can be built from tags and other command strings to perform card related and system related functions.

Command tags exist to perform almost any possible action within the UCI. In many ways they can be considered as forming a high level programming language. Command tags come in three types, relative, direct and indirect. The behaviour of a direct command tag cannot be varied, the exact behaviour being coded into the tag. Relative and indirect tags use parameters to modify the behaviour of the tag. With relative tags, the modifying parameters follow the tag in the command string. With indirect command tags the parameters are read from a parameter stack, which may be altered by other tags. Examples of command tags include:

Determine card type & issuer,
Call Access_Sync_Card function,
Call Access_Async_Card function,
Read magnetic card data,
for card interface matters;

Send messages to printers, modems, displays,
Get data from keypads, input switches,
Read real-time clock,
for controlling external devices; and Copy, manipulate data strings,
Compare strings, Test 'condition',
Skip next command tag if 'condition', Jump to new command string,
Call new command string,
for internal program operations.

For interacting with the cards it is important to know the data structure and format of the card's memory. For organising and supplying the required data regarding the card's memory, the UCI has a file format database. Once the card type and issuer number have been identified, and (if applicable) an application selected, the database can be used to guide access to the applications files. Table 8 is an example of such a database showing the subdivisions through card type, issuer, and application. Files for a given application are referenced by file number, and possible file name, these in turn pointing to a file descriptor.

TABLE 8

| Card Type | Issuer | Application | File Number | File Name | File Descriptor |
|---|---|---|---|---|---|
| Card A | Bank 1 | Bankcard I | 1 | | |
| | | | 2 | | |
| | | | 3 | | |
| | | | 4 | | |
| | | | 5 | | |
| | | | 6 | | |
| | | | 7 | | |
| | | Creditcard m | 1 | | |
| | | | 2 | | |
| | | | 3 | | |
| | | | 4 | | |
| | | | 5 | | |
| | | | 6 | | |
| | Bank 2 | Bankcard j | 1 | | |
| | | | 2 | | |
| | | | 3 | | |
| | | | 4 | | |
| | | | 5 | | |
| | | | 6 | | |
| | | | 7 | | |
| | | | 8 | | |
| | | | 9 | | |
| | | | 10 | | |
| | | | 11 | | |
| Card B | Bank 3 | Creditcard n | | I | |
| | | | | e | |
| | | | | j | |
| | | | | s | |
| | | Bankcard k | 1 | | |
| | | | 2 | | |
| | | | 3 | | |
| | | | 4 | | |
| | | | 5 | | |
| | | | 6 | | |
| | | | 7 | | |
| | | | 8 | | |
| | | | 9 | | |
| | | | 10 | | |
| | | | 11 | | |

File Descriptors list the following file attributes:
File type
Debit key pointer
Credit key pointer
Secret code pointer
Read authority
Write authority
Update authority
File size
Cypher method Key pointers can also indicate any need for remote key access. AS2805 (or similar) protocols, on-line credit, or other facilities.

Each time a new file (or "file area" in the case of a memory card) is selected, the file status register is updated. This contains some or all of the following information:

| | |
|---|---|
| File hierarchy/Directory | |
| File number/Name | |
| File identifier | optional long name |
| File description | purse / keys / standard / proprietary |
| Option | purse specific |
| Size | in bytes+bits |
| Access criteria | read / write / update levels, and locks. |

With cards that do not support the more advanced features, the relevant parts of the register will be blank.

Similar but more limited information is available from cards which support more than one issuer area. The following is some data typically available when switching directories:

Directory number
Access conditions.

Some general data can be accessed from the card by a rudimentary examination. This information is used by layers 4 and 6 of the UCI to support and corroborate the information derived from Table 8.

Layer 4 of the UCI program takes care of entry procedures. Its purpose is to interface with the card data structures, files, purses and directory. One of the functions performed by layer 4 is determining the issuer of an inserted card. Once the card type is determined, a number of command strings are trialed to attempt identification of the card file and data layout. An example of command strings to attempt for differing card types are shown in Table 9.

TABLE 9

| Card Type | Command String(s) to Attempt | Resultant Issuer Numbers |
|---|---|---|
| 1 | 1, 2, 3 | 16, 16, 16 |
| 2 | 7, 38 | 3, 8 |
| 3 | 8 | 2 |
| 4 | 9, 32 | 15, 8 |
| 5 | 25, 42 | 16, 9 |
| 6 | 10 | 16 |
| 7 | 4, 5, 6 | 9, 16, 16 |
| 8 | 16 | 12 |
| 9 | 11 | 4 |
| 10 | 23, 51 | 3, 4 |
| ... | ... | ... |

If a command string performs as programmed, the resultant issuer number becomes the reference to the card issuer (or co-occupying application).

Once the card issuer number has been determined, higher code layers can determine the capabilities of the current card and application combination.

One example of a command string action used primarily for issuer identification is:

CS n:
IF card is "Async" and Multi directory
  Select Master directory
  Find First "Unrestricted Read" file
  Open File
  Read File
  IF file contents=CRD pattern
    copy file data to CRD buffer
    set Issuer Number=n Layer 4 also takes responsibility for the key and secret code handling for cards.

Layer 5 of the UCI contains the process primitives for interacting with the cards. For each card related generic function accessed at layer 8 of the UCI, layer 5 includes a table of card type+issuer numbers showing the corresponding command string for that application. Nulls take the place of command string numbers if the requested function is invalid for the current card or application.

This table allows translation from the generic function descriptions of layer 8 to the application specific descriptions of the lower layers.

Layer 5 also includes support routines for:

Communications protocols (decisions on use of DES, HDLC, modem, deferred uploads)
Debit, credit transactions
Financial transactions to AS2805 or similar
MACing
Transaction log uploading
Message formatting
Security module logical connection to card application
Key and secret code handling for communications
RSA cypher While layer 5 includes tables and routines for the process primitives, layer 6 makes use of these tables and routines to translate between the generic functions and instructions of layers 7 and 8, and the lower layers card type or issuer or application specific instructions of the lower layers.

Layer 7 provides a uniform reduced set of instructions for use by the external device.

Layer 8 of the UCI isolates the user (the external device) from all the lower levels, so that the user may issue simple generic commands and allow the UCI to take the complicated actions that are required to execute the commands. Effectively the interface at layer 8 becomes seemingly independent of card type.

The UCI at layer 8 could be communicated with by the user for example by switches, buttons, and relays or RS232 serial data link.

Examples of the generic commands that would be acted on by layer 8 are:

New card detected
Identify new card, read card number, global and user summary
Account balance (acc)
Update global, user information
Debit account (acc, amnt)
Credit account (acc, amnt)
Read unformatted data file (filename)
Update unformatted data file (filename)
Upload transactions
Download OS (operating system)
Read keypad
Print message
Display message
Configure display, printer, modem, I/O devices
Load key(s).

As an example of the operation of the UCI, when a new card is inserted, layer 8 receives a signal from "New Card Detected" (layer 1). The external device (user software) may then decide to identify the card, and possibly conduct a transaction.

From layer 8: execute Identify New Card etc
this translates to the following actions:
  execute decide_card_type to determine manufacturer card type (this uses procedures covered by tables 2 and 3, these in turn use procedures mentioned in respect of layer 2)
  execute procedures outlined with regard to layer 4 to identify any possible application(s) (this uses the functions of layer 3, command strings, command tags, and the related data of tables 6 and 7).

As another example of the UCI in operation, when debiting an account from a card, From layer 8: execute Debit(acc #, amt $) function [L8.1.5]
From layer 6: use the table in layer 5, check if CommandString exists for "Debit" for this card
From layer 6: execute CommandString (sequence of Command Tags) if available in table.

From layer 3: the CommandString is interpreted into following actions:

select Application Area/subdirectory on card,
select File or Purse File in subdirectory,
select correct cypher keys if required (as indicated in CommandString), (selection of subdirectories, files and keys is aided by use of Table 8)
present any cypher keys used,
alter File or Purse File by "amount",
record transaction details (if required).

Therefore the simple generic command "Debit" issued to the UCI is all that is required by the user software, the UCI completing all aspects of the interfacing with the actual card, independent of the card type of issuer.

The UCI in the preferred embodiment described has the advantages that:
1) it can recognise a multitude of card types,
2) it knows the features and limitations of each card type,
3) it knows the arrangement of data on each card type and all relevant rules for access,
4) actions are not predefined, but are determined by external devices, and
5) the interface to the external device is simple, so that the manufacturer of the external device needs little or no external knowledge of smartcards, security algorithms, or financial transaction handling.

What is claimed is:

1. A card reader/writer which interfaces a host application program with a data storage card having an associated card application, characterised in that:

said card reader/writer can respond to said host application program using at least one designated high level language, a plurality of lower level protocol sets are stored which correspond to a plurality of different data storage card applications, said card reader is able to identify from the card the particular card application for any card interfaced to it for which it has a protocol set, and select from its store of protocols the appropriate lower level protocol for the identified card application, said card reader/writer reads and translates high level language commands from the host program to corresponding commands within said established lower level protocol and writes these lower commands to said card, and said card reader/writer reads commands or data in said established lower level protocol from said card translates them to corresponding commands or data in said high level language and writes these commands or data to said host application program.

2. A card reader/writer according to claim 1 characterised in that it can be loaded with one or more further protocol sets appropriate to one or more card applications additional to those for which protocol sets are initially stored, or that it can be loaded with a new suite of protocol sets to replace those initially stored, including at least some of those initially stored and one or more further protocol sets additional to those initially stored.

3. A card reader/writer according to either claim 1 or claim 2 characterised in that a plurality of card application-characterising strings are stored which correspond to a plurality of data storage card applications, said card reader/writer reads from a card interfaced to it the data string which characterises the card application, and said card reader/writer matches said read data string with a said stored card application-characterising string to thereby identify the card application.

4. A card reader/writer according to claim 1 or claim 2 characterised in that a plurality of card application-characterising strings are stored which each correspond to a known data storage card application, said card reader/writer reads from a card interfaced to it the data string which characterises the application, and said card reader/writer matches said read data string with said stored card application-characterising string to thereby identify the card application, and in that each said low level protocol set comprises a set of command strings and said card reader/writer translates high level language commands from the host program to corresponding command strings.

5. A card reader/writer according to claim 2, characterised in that said card reader/writer identifies commands from said host program not supported by said card application and upon identifying an unsupported command writes an error command to said host program.

6. A method of interfacing a host application program with a data storage card having an associated card application, comprising the steps of:

identifying the particular card application from the card, selecting from a store of a number of protocols for a number of different card applications the appropriate lower level protocol for the identified card application, reading high level language commands from the host program, translating said read high level language commands to corresponding commands within said identified lower level protocol, writing said corresponding commands to said card, reading commands or data in said established lower level protocol from said card, translating said lower level protocol commands or data into corresponding commands or data in said high level language, and writing said corresponding commands or data in said high level language to said host application program.

7. A method according to claim 6 wherein identifying the particular card application includes the steps of reading from the card a data string which characterises the card application and matching said read data string with a card application-characterising string from a plurality of stored card application-characterising strings, corresponding to a plurality of different data storage card applications, to thereby identify the card application.

8. A method as claimed in either claim 6 or claim 7 including the step of identifying high level language commands read from the host program not supported by said card application and upon identifying an unsupported command, returning an error command to said host program.

9. A method of enabling a controller to read and write data via a card read/write station to an electronic data storage card having an associated card application, which method uses a stored-program stored-data processor, said method comprising: storing first data arrays containing strings of different card application-characterising data and for each string its corresponding card identifier, storing second data arrays containing card identifiers and for each identifier its corresponding command strings, and executing a program on said processor which causes said processor to:

(1) detect a card presented to said read/write station and to pass a card detect signal to said controller, (2) read the data string which characterises the card application, (3) search through at least one said first array for a matching data string, and upon making a successful match to retrieve the corresponding card application identifier, (4) select the appropriate command strings in said second array using the retrieved card application identifier, (5) accept generic transaction instructions from said controller, (6) translate the instructions from said controller to commands appropriate to the card application using the selected command strings from the second array, and (7) either read or write data to said card in accordance with said generic instructions.

10. A universal card interface for interfacing smartcards and other card devices having electronic data storage and having associated therewith a card application, with a controller requiring read/write access to said card comprising:

a card read/write station to which cards may be interfaced for data transfer, a processor having associated memory and input-output ports, said read/write station connected to one input-output port and said controller connected to a second input-output port, interface software and data arrays stored in said memory, said data arrays including first and second data arrays with said first data arrays containing strings of different card application-characterising data and for each string its corresponding card application identifier, said second data arrays containing card application identifiers and for each identifier its corresponding command strings, said software when executed by said processor causing said processor to:

(1) detect the presence of a card presented to said read/write station and to pass a card detect signal to said controller, (2) read from the card the data string which characterises the card application, (3) search through at least one said first array for a matching data string, and upon making a successful match to retrieve the corresponding card application identifier, (4) select the appropriate command strings in said second array using the retrieved card application identifier, (5) accept generic transaction instructions from said controller, (6) translate the instructions from said controller to commands appropriate to the card application on the card using the selected command strings from the second array, and (7) either read or write data to said card in accordance with said generic instructions.

11. A method of enabling host application software to interface with any known type of smartcard or other data storage card devices having an associated card application, comprising:

(1) reading from the card to be interfaced the data string which characterises a particular card application, (2) searching through a first data array containing strings of different card application-characterising data, and for each string its corresponding card application identifier, for a matching data string, and upon making a successful match retrieving the corresponding card identifier, (3) selecting the appropriate command strings from a second data array containing card application identifiers, and for each identifier its corresponding command strings, using the retrieved card application identifier, (4) accepting generic transaction instructions from said host application software, (5) translating the instructions from said host application software to lower level commands appropriate to the card application being interfaced using the selected command strings from said second data array, and (6) causing data to be either read from or written to said card in accordance with said generic instructions.

12. A software algorithm which enables host application software to interface with different types of smartcard or other data storage card devices having associated therewith a card application, comprising a hierarchy of functional modules wherein:

a first level module reads from the card to be interfaced the data string which characterises that card application and passes said data string to a second level module, the second level module searches through a first data array containing strings of different application-characterising data, and for each string its corresponding card application identifier, for a matching data string, and upon making a successful match retrieves the corresponding card application identifier and passes said card application identifier to a third level module, the third level module selects the appropriate command strings from a second data array containing card application identifiers, and for each identifier its corresponding command strings, using the card application identifier passed to it, a fifth level module accepts generic transaction instructions from said host application software and passes those instructions to a fourth level module, the fourth level module translates the instructions from said fifth level module to lower level commands appropriate to the card application being interfaced using the command strings selected by the third level module, and the first level module either reads from or writes to said card in accordance with the translated generic instructions passed from the fourth level module.

* * * * *